W. H. DEMUTH.
TRASH CATCHER FOR FLUMES.
APPLICATION FILED FEB. 19, 1917.
1,252,410.
Patented Jan. 8, 1918.
2 SHEETS—SHEET 1.
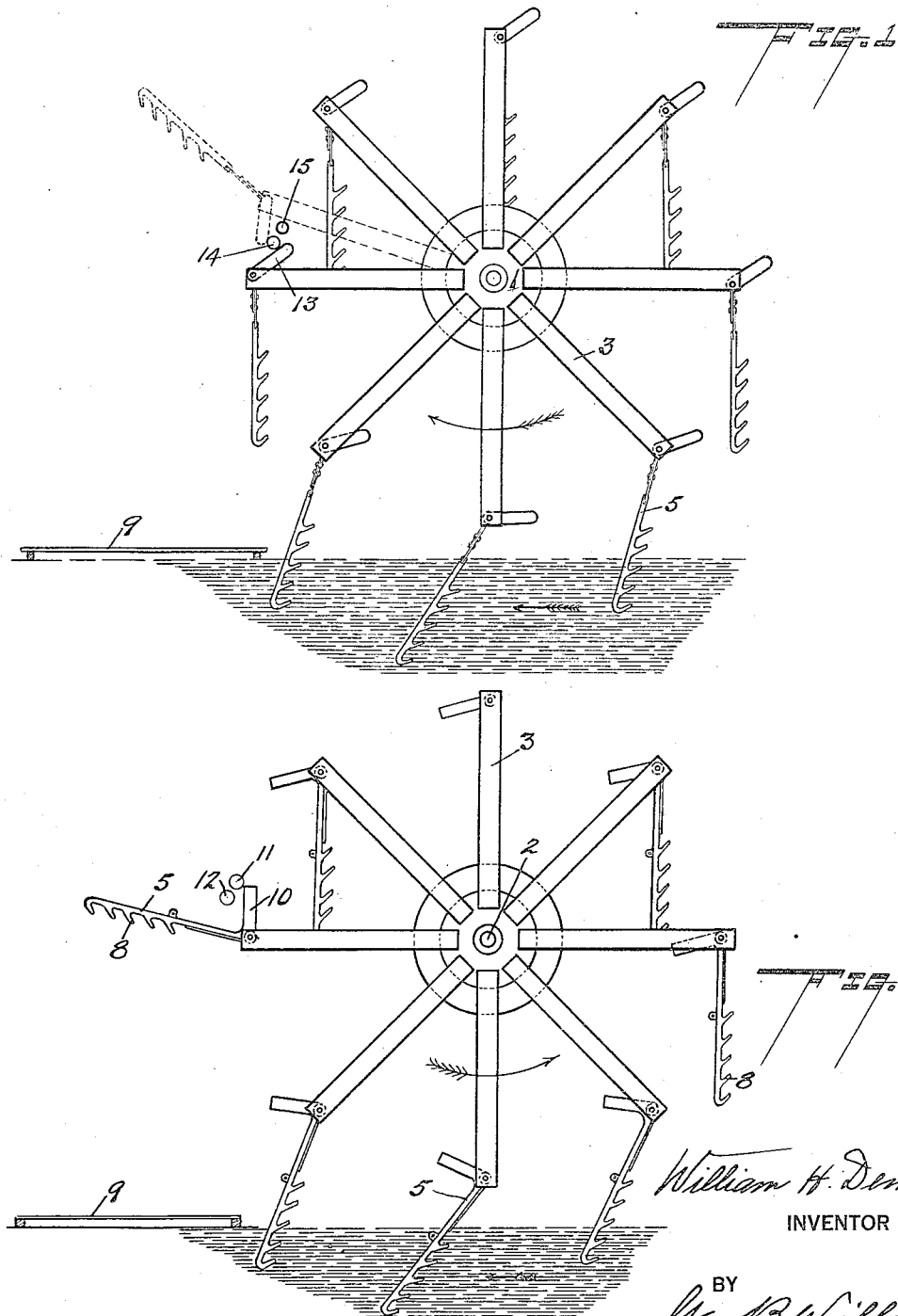

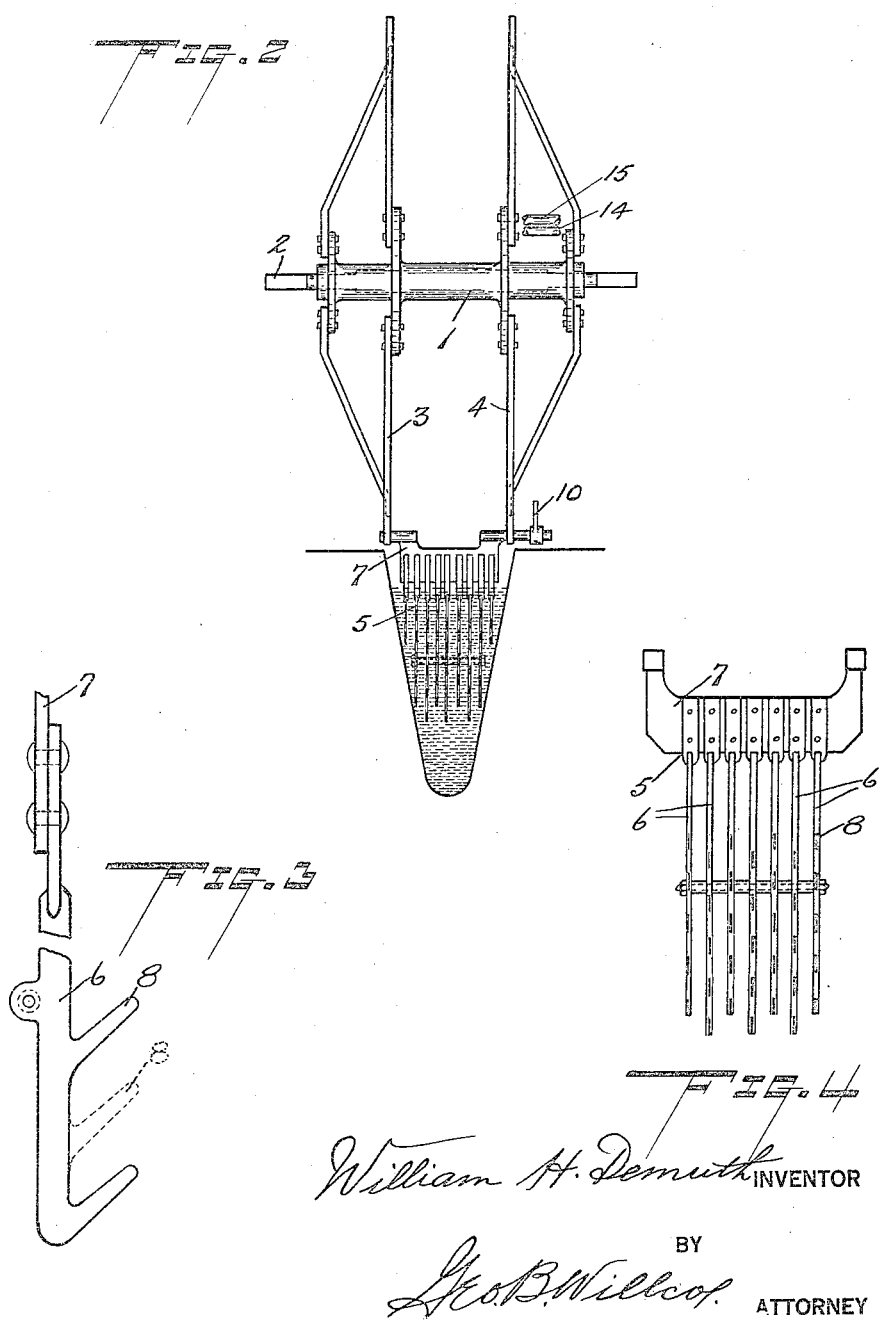

UNITED STATES PATENT OFFICE.

WILLIAM H. DEMUTH, OF OWOSSO, MICHIGAN, ASSIGNOR OF ONE-HALF TO FRANK S. SMITH, OF OWOSSO, MICHIGAN.

TRASH-CATCHER FOR FLUMES.

1,252,410. Specification of Letters Patent. Patented Jan. 8, 1918.

Application filed February 19, 1917. Serial No. 149,633.

*To all whom it may concern:*

Be it known that I, WILLIAM H. DEMUTH, a citizen of the United States, residing at Owosso, in the county of Shiawassee and State of Michigan, have invented certain new and useful Improvements in Trash-Catchers for Flumes; and I do hereby declare the following to be a full, clear, and exact description of the invention, such as will enable others skilled in the art to which it appertains to make and use the same.

This invention relates to weed and trash catchers for removing weeds, etc., from a flume, as for example, the beet flume of a sugar factory.

My improvement pertains more particularly to a rotatable trash catcher of simple construction, having few working parts, and those parts so combined as to produce a trash-catching machine that is strong and durable, positive in operation and requiring practically no attention, although it is operated continuously during the campaign of a sugar beet factory.

Further objects are to provide a catcher that will pick up even small weeds, leaves, sticks, etc., and that will jar the rakes at each operation to clear them of clinging pieces of weeds or other refuse.

With the above and certain other objects in view which will appear later in the specification, my invention comprises the devices described and claimed and the equivalents thereof.

In the drawings, Figure 1 is a side elevation of a preferred form of the weed catcher, adapted to revolve in the same direction as the flow of the stream in a beet flume, the supporting frame and driving mechanism being omitted.

Fig. 2 is a part end elevation of the same, with all the rakes except the lower removed.

Fig. 3 is a detail of the lower end of a rake bar.

Fig. 4 is a front view of one of the swinging rakes.

Fig. 5 is a side elevation of a modified form of the catcher, adapted to revolve against the stream in the flume.

As is clearly shown in the drawings, the device consists in a hub 1, revolubly mounted, as on a suitably mounted shaft 2, and carrying two sets of radially disposed arms 3 and 4, the two sets of arms being spaced apart on the hub, as shown in Fig. 2.

To the extremities of each pair of arms, is pivoted a rake 5. The rakes normally hang from the arms in substantially vertical planes during the greater part of the revolution of the hub and arms, and the rakes are arranged with reference to the beet flume so as to successively dip vertically into the flume, travel along it a short distance and then gradually rise in a substantially vertical position from the flume at each revolution of the arms, as indicated in Figs. 1 and 5.

The construction and arrangement of the rake parts is one of the important features of my improvement, whereby I attain a high degree of efficiency in the removal of weeds and trash from the flume, without removing small beets.

The beets usually travel nearer the bottom of the flume, while the weeds and refuse travel nearer the surface of the water.

To effectively remove the refuse without removing the beets, I provide the preferable form of rake illustrated in Figs. 3 and 4, in which 6, 6 are bars, spaced apart and fixed at their upper ends to a yoke 7, which is pivotally suspended between the pairs of arms 3, 4.

A plurality of upwardly projecting teeth 8 are arranged preferably on the forward or up-stream side of each bar, the teeth of adjacent bars being staggered with relation to each other, as indicated by dotted lines in Fig. 3.

The teeth of the assembled rake in its preferred form do not, therefore, present lodgment for beets, and the rakes will remove only the weeds, leaves, chips and other refuse.

Upon entering the water in the flume, the rake assumes a position in the current such that the teeth will be slightly inclined upward. As the rake becomes more deeply submerged the current tilts the rake backward until its teeth are substantially horizontal. Upon leaving the water, the rake assumes a more nearly vertical position, with the teeth consequently assuming an upwardly inclined position, as shown in Figs. 1 and 5.

In the form of weed catcher shown in

Fig. 5 the rakes are made to traverse the flume up-stream, while in the form shown in Fig. 1 the rakes traverse the flume downstream, but at a slower rate of speed than the stream itself.

I provide with both forms, suitable means for tilting the rakes to proper position for dumping their loads of refuse when the rakes have been carried by their arms 3 and 4 to a point above any suitable receiving platform 9.

Means is also provided for imparting a slight jolt to the rakes, while they are in their inverted or dumping positions and for then permitting the rakes to assume their normal vertical position.

Referring to Fig. 5 of the drawings, 10 is a trip-arm projecting from the yoke 7 on that side of the rake opposite the teeth 8.

Above the platform 9, and supported in fixed position in any suitable manner is a stop 11, located in the path of travel of arm 10 in such manner that the arm 10 will engage the stop 11 and, with the continued movement of the arms 3 and 4, will swing the rake outwardly until its teeth 8 are nearly vertical. The greater part of the load of refuse on the rake drops to the platform. To dislodge any pieces of refuse still adhering, I provide a second fixed stop 12, slightly below and radially outward from stop 11, so arranged that the arm 10, upon leaving stop 11 will drop to stop 12, jolting the rake sufficiently to dislodge any adhering refuse, after which the arm 10 passes beyond the stop 12 and permits the rake to swing back to its normal position.

In the form of catcher shown in Fig. 1, the revolution being in the opposite direction from that just described, the positions of the arms and the stops are reversed. In this arrangement the arm 13 is located on the toothed side of the rake, and the rake-lifting stop 14 is located below and radially outward from the jolting stop 15. In this form of device the rake swings upwardly and outwardly when its arm encounters the lifting stop 14, and in its raised position is jolted when the arm leaves stop 14 and strikes stop 15.

The platform 9 may be so placed that when the rakes begin to emerge from the water in their tilted back position caused by the current, they will contact with the edge of the platform and be forced by the continued movement of arms 3 and 4, into substantially vertical planes before they are entirely out of the water, in which position the teeth will be upwardly inclined and will best retain the refuse they have picked up.

By the means above described, I have produced a highly efficient trash catcher that removes the floating sticks, leaves and like material, but does not remove the beets. The changing angles of the rake teeth with reference to the direction of flow, as the rake passes through the water, insures proper seizure of the refuse, and lifts it from the water without permitting pieces to drop back into the flume.

The device for inverting and jolting the rakes is simple, effective, and operates without objectionable jar or noise.

Having thus described my invention, what I claim and desire to secure by Letters Patent is:

1. In a trash catcher for flumes, the combination of a revoluble shaft, pairs of radial arms carried by said shaft, and spaced apart, a rake pivotally suspended between the ends of each pair of arms, each rake comprising a pivoted yoke, downwardly projecting bars carried by said yoke, a plurality of forwardly and upwardly projecting teeth carried by each bar, a laterally projecting trip arm fixed to said yoke, a fixed stop located in the path of travel of said trip arm and adapted to be engaged by said arm to raise the rake, and a second fixed stop adapted to be subsequently contacted by said arm to jolt the rake while raised.

2. In a trash catcher for flumes, the combination of a revoluble shaft, pairs of radial arms carried by said shaft and spaced apart, a rake pivotally suspended between the ends of each pair of arms, each rake comprising a pivoted yoke, downwardly projecting bars carried by said yoke, a plurality of forwardly and upwardly projecting teeth carried by each bar, the teeth of adjacent bars being in staggered relation, a laterally projecting trip arm fixed to said yoke, a fixed stop located in the path of travel of said yoke, a fixed stop located in the path of travel of said trip arm and adapted to be engaged by said arm to raise the rake, and a second fixed stop adapted to be subsequently contacted by said arm to jolt the rake while raised.

In testimony whereof, I affix my signature in presence of two witnesses.

WILLIAM H. DEMUTH.

Witnesses:
ALBERT DENSMORE,
CHARLES ELLIS.

Copies of this patent may be obtained for five cents each, by addressing the "Commissioner of Patents, Washington, D. C."